May 24, 1938.  J. P. CROWLEY ET AL  2,118,170
CUTTING MACHINE
Filed Aug. 6, 1936  11 Sheets-Sheet 8
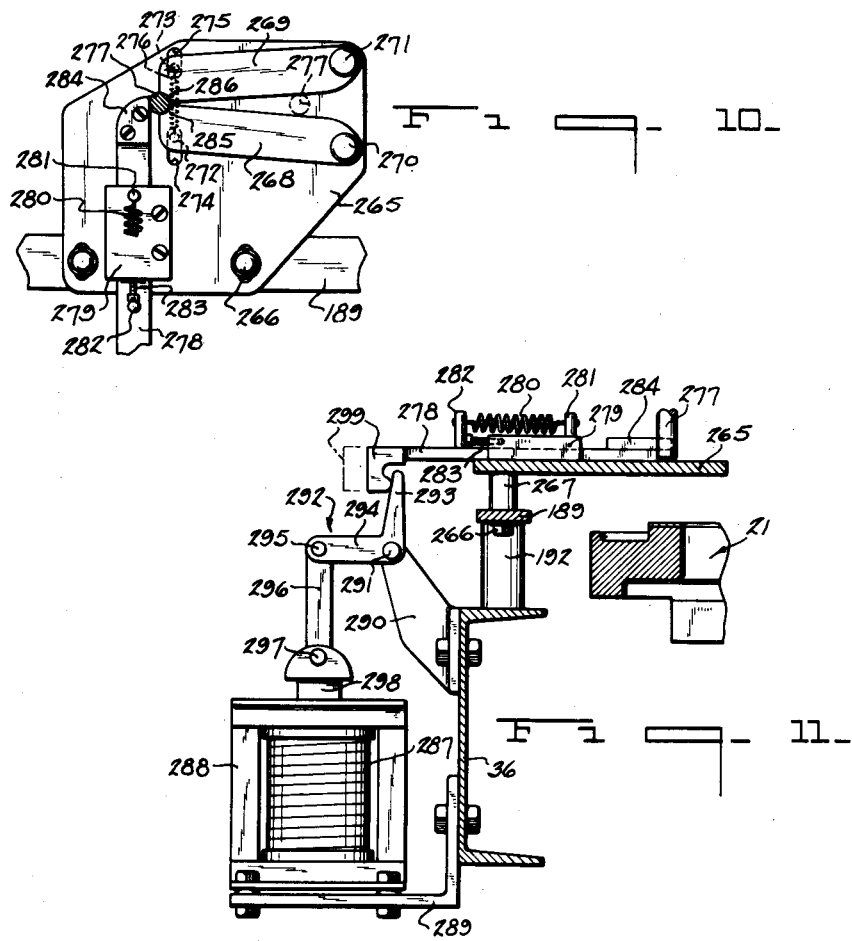
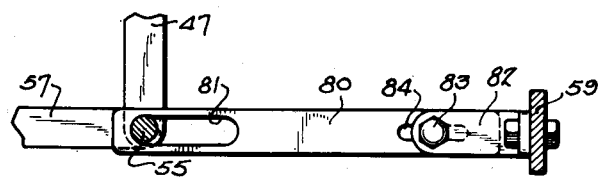
Inventors
JOSEPH P. CROWLEY.
CONRAD B. SCHAFER.
By Frank Fraser
Attorney May 24, 1938.  J. P. CROWLEY ET AL  2,118,170
CUTTING MACHINE
Filed Aug. 6, 1936  11 Sheets-Sheet 10
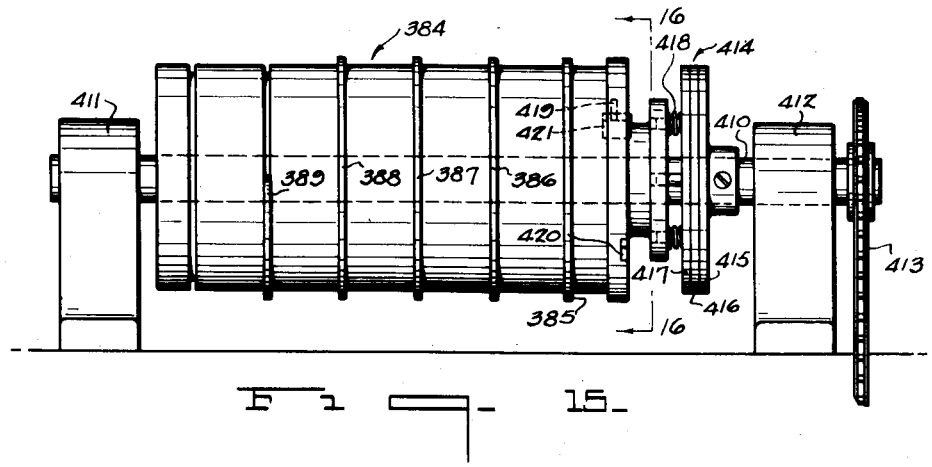
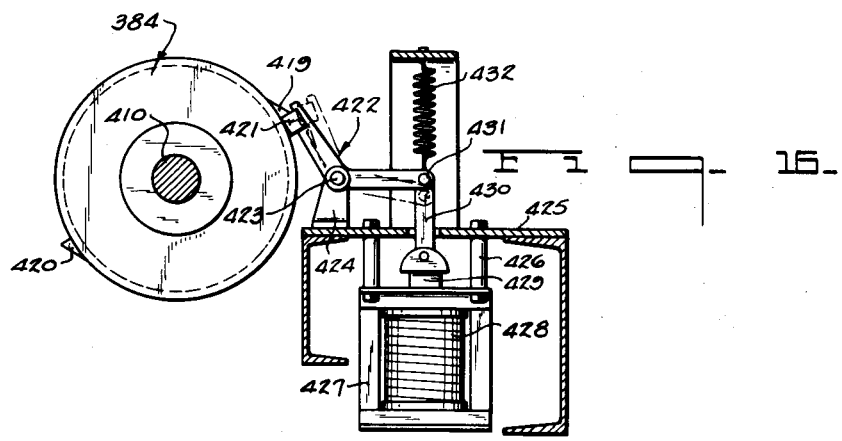
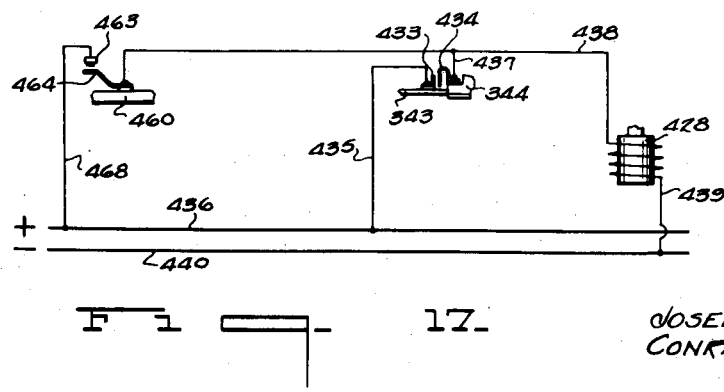
Inventors
JOSEPH P. CROWLEY.
CONRAD B. SCHAFER.
By Frank Fraser
Attorney

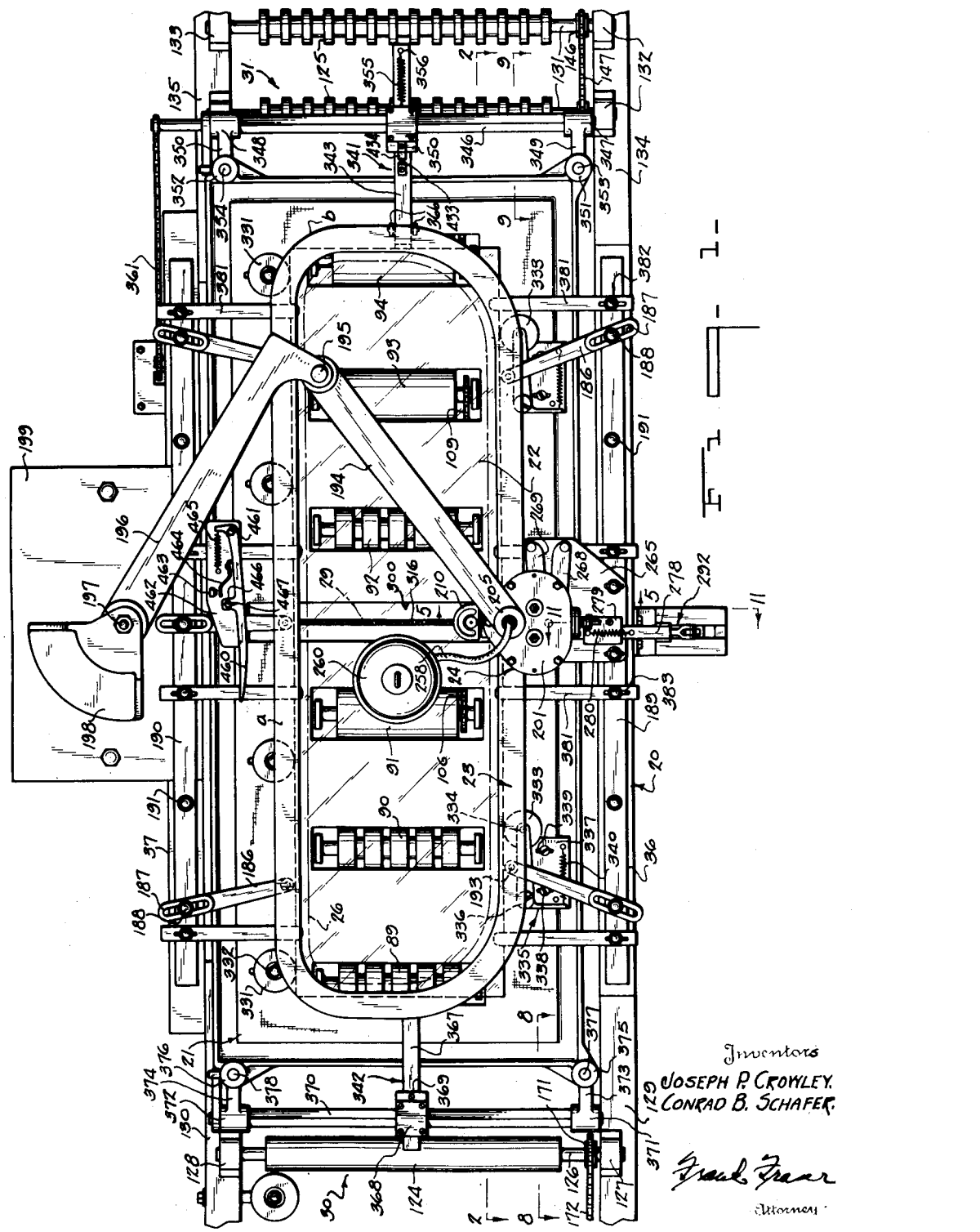

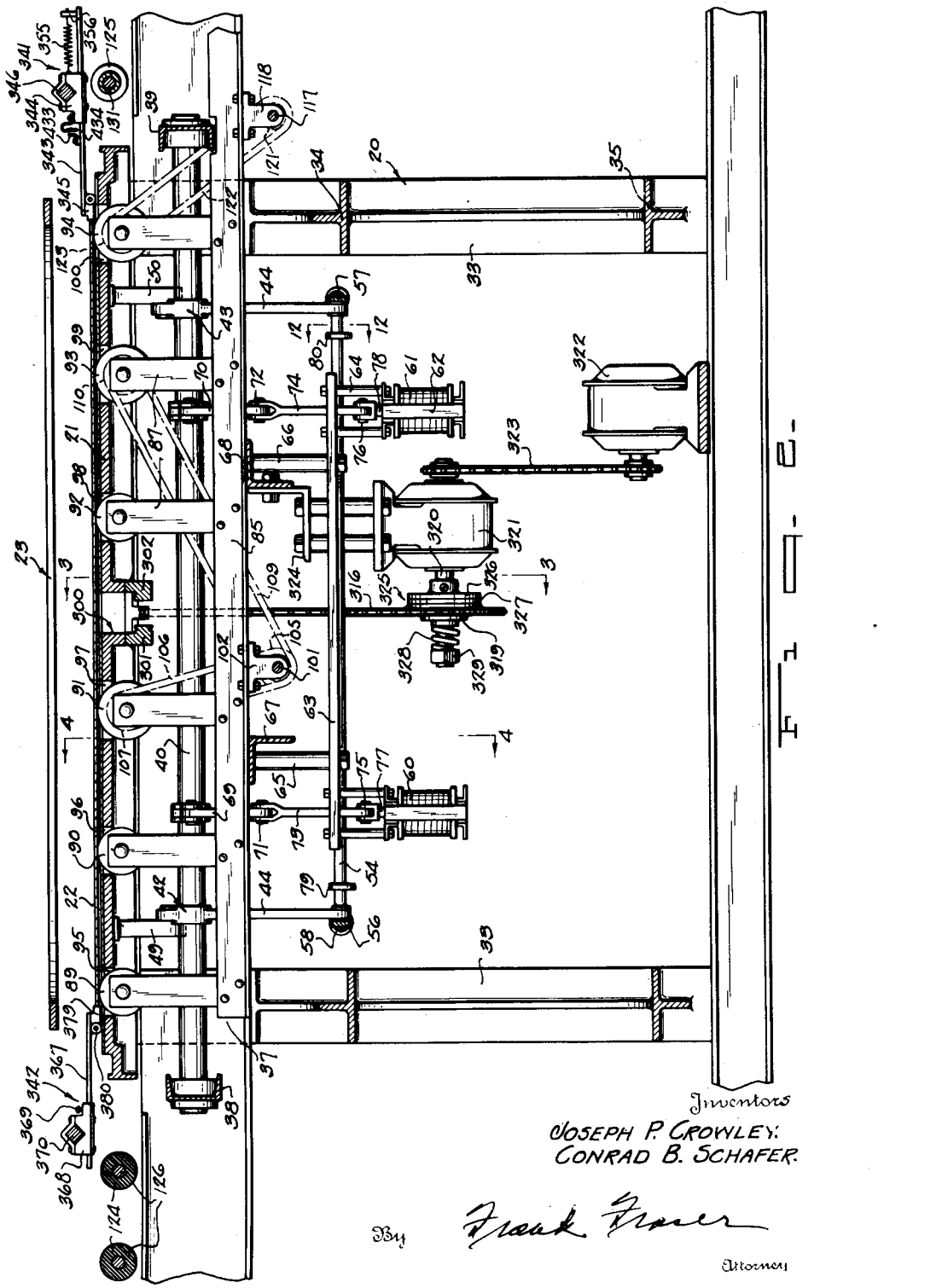

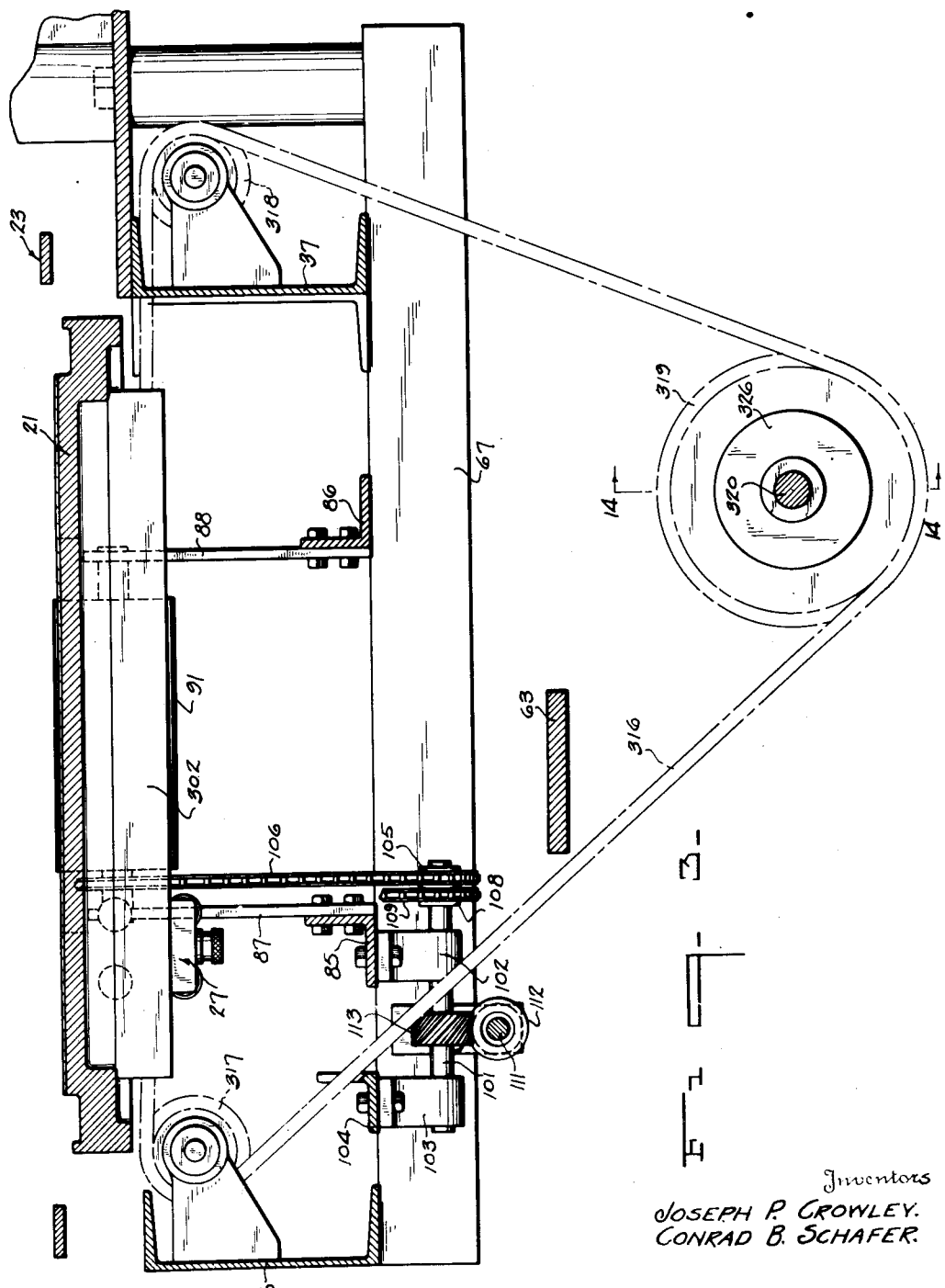

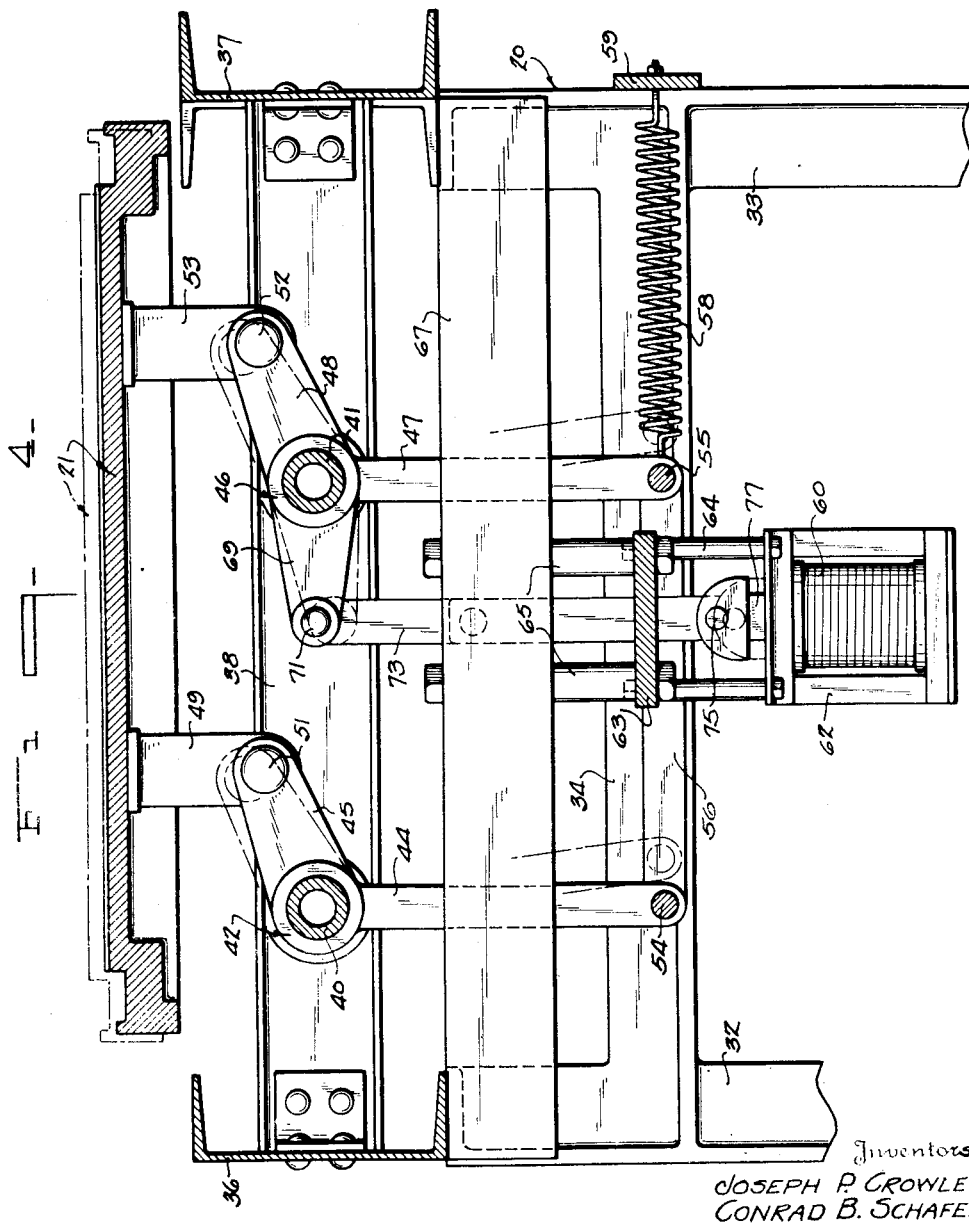

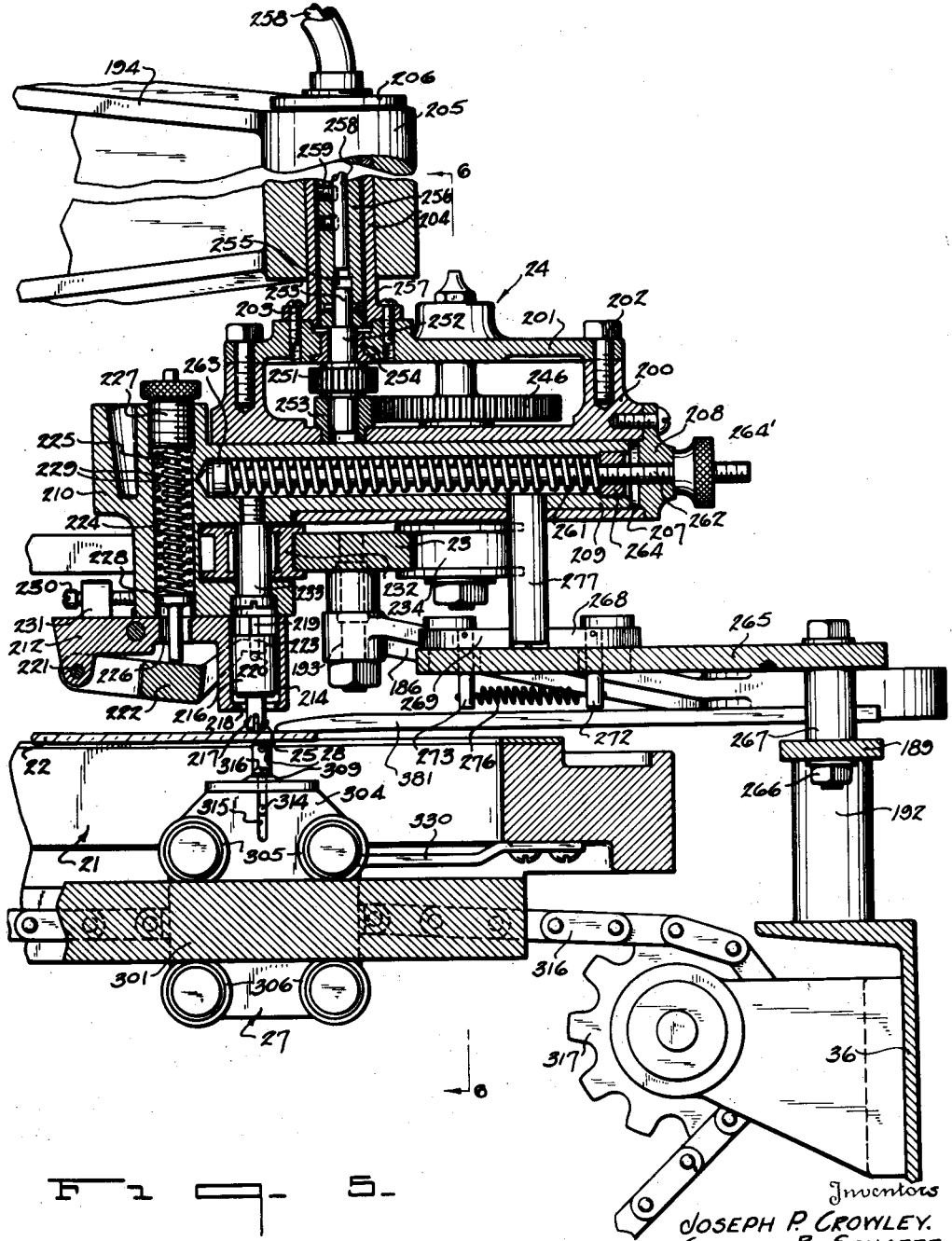

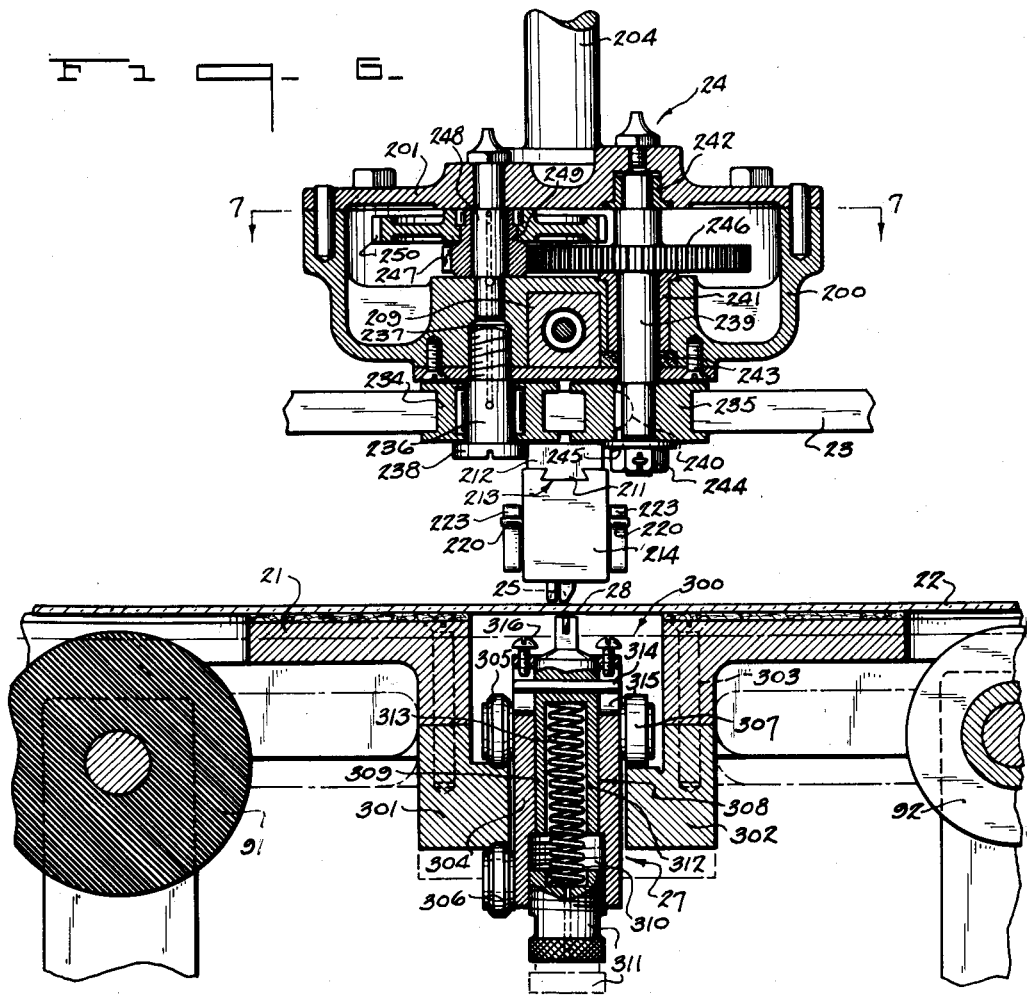
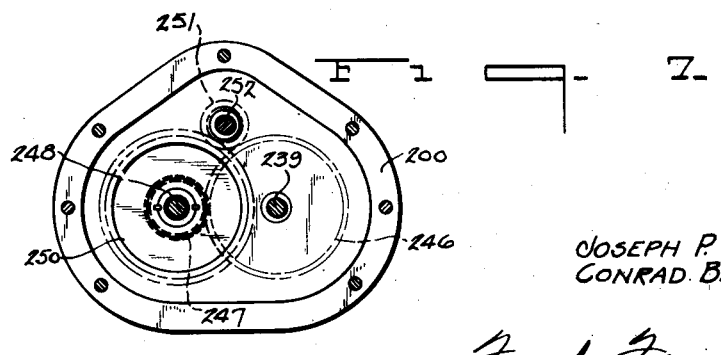

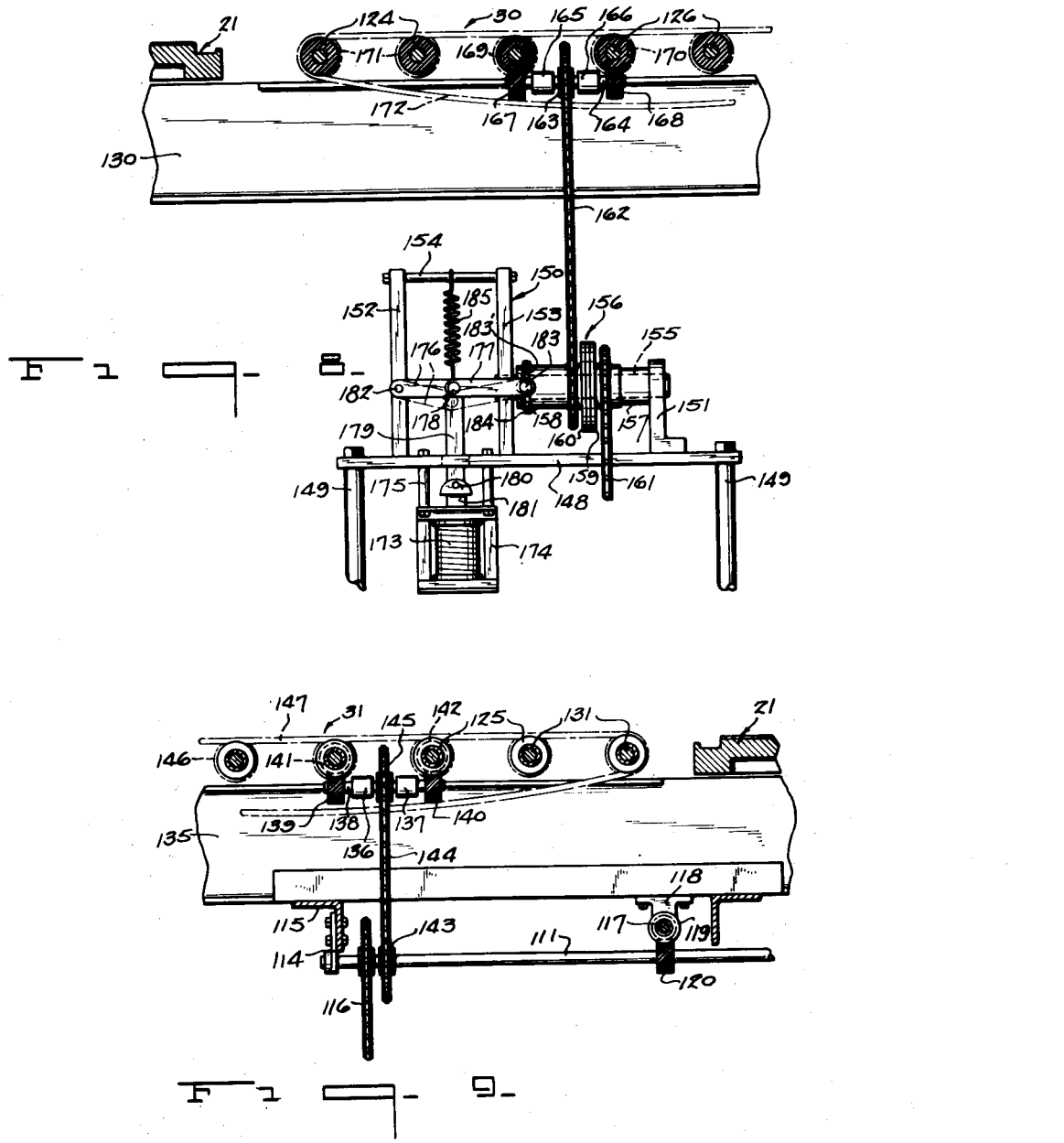

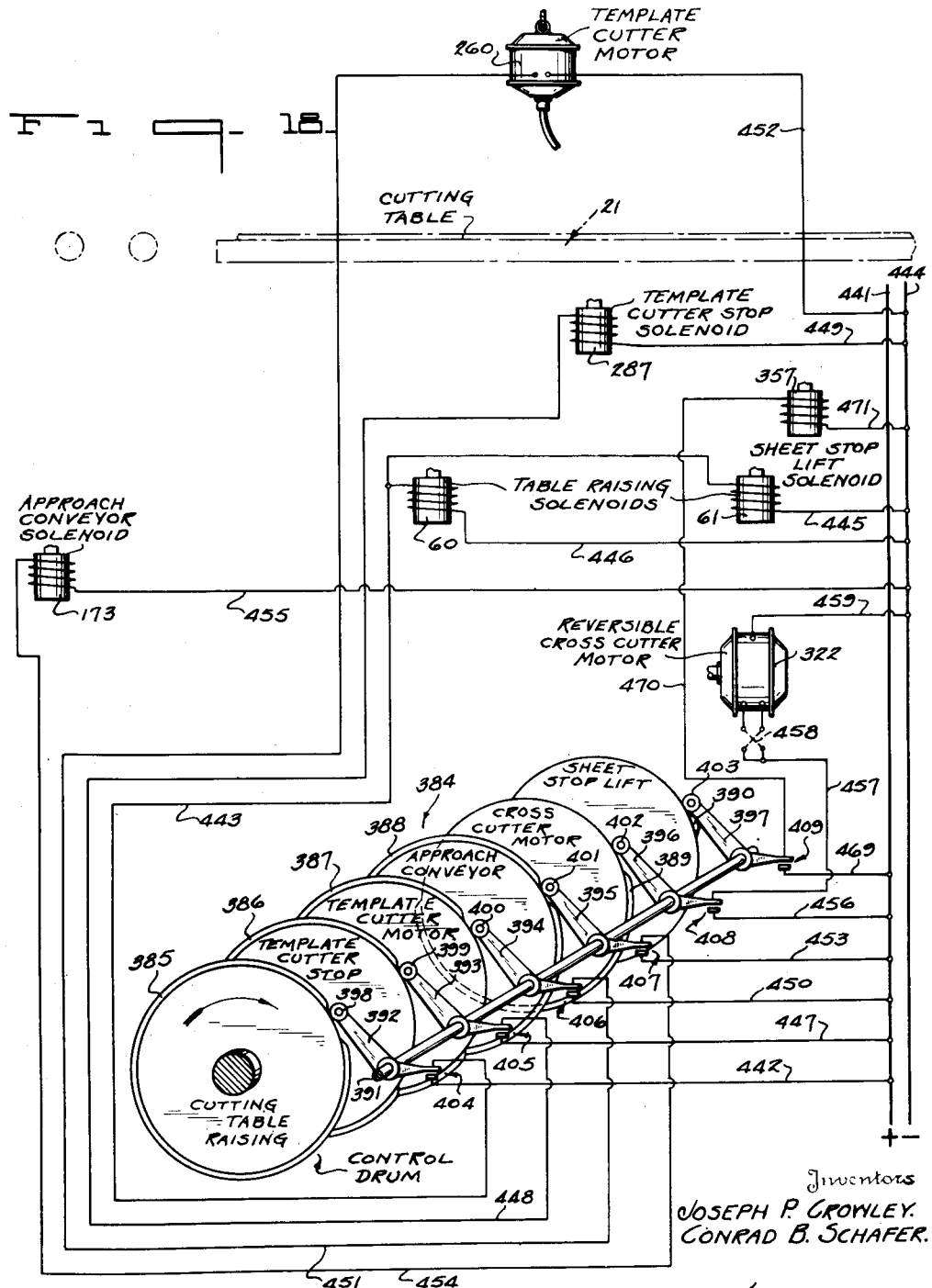

Patented May 24, 1938

2,118,170

UNITED STATES PATENT OFFICE 2,118,170

CUTTING MACHINE

Joseph P. Crowley and Conrad B. Schafer, Toledo, Ohio, assignors to Libbey-Owens-Ford Glass Company, Toledo, Ohio, a corporation of Ohio Application August 6, 1936, Serial No. 94,566

24 Claims. (Cl. 33—27)

The present invention relates to improvements in cutting machines generally and more particularly to a machine designed primarily for the cutting of flat sheets or plates of glass or the like.

While the invention is of course not limited to the cutting of any particular shape or size of glass sheet, it is especially applicable to the cutting of so-called half windshields for automobiles. It has been customary in the past for the windshields of automobiles to consist of a single sheet or plate of glass extending the entire width of the machine. More recently, however, the practice has been to make the windshields of two sheets or plates of glass separated at their inner adjacent edges by a substantially vertical post or the like arranged at the center of the machine. Each sheet or plate of glass is referred to as a half windshield and two similar half windshields are used to make the complete windshield.

Prior to this invention, it was the usual practice to cut the half windshields by hand, this being done by taking a sheet of glass of the approximate size of the half windshield and employing a pattern plate or template member of the desired shape and size which was laid upon the sheet to be cut, after which a cutting or scoring tool was drawn by the operator over and in contact with the glass, being held in engagement with the edge of the template or pattern and guided thereby. After the glass was scored, the template or pattern was removed and the glass broken along the score line.

The hand method of cutting above described is, however, open to several objections among which may be mentioned the fact that the template must usually be held upon the glass with one hand while the operator draws the scoring tool over the glass with the other hand. When so manipulated, the template sometimes slips or becomes misplaced and the work is spoiled. Also, a uniform cutting pressure on the cutting tool is difficult to maintain throughout its path of travel when moved by hand, with the result that the score is deeper at some places than at others, so that in separating the waste from the cut out section, a rough break occurs leaving the edges of the cut out section more or less ragged. Consequently, the hand cutting of glass sheets requires highly skilled workmen.

An important object of the present invention is the provision of a cutting machine which will effectively overcome all of those objections referred to above as being present in hand cutting and by means of which it is possible to cut out from glass sheets or plates half windshields of the desired contour rapidly, accurately, and economically.

Another important object of the invention is the provision of a cutting machine which will cut out in a single operation the two half windshields going to make up a complete windshield, the machine being entirely automatic in its operation, thereby greatly increasing the speed of production of the machine as well as reducing to a minimum the effort and attention required on the part of the operator.

Other objects and advantages of the invention will become more apparent during the course of the following description when taken in connection with the accompanying drawings.

In the drawings wherein like numerals are employed to designate like parts throughout the same, Fig. 1 is a plan view of a cutting machine constructed in accordance with the invention;

Fig. 2 is a longitudinal vertical sectional view taken substantially on line 2—2 of Fig. 1;

Fig. 3 is a transverse vertical sectional view taken substantially on line 3—3 of Fig. 2;

Fig. 4 is a transverse vertical sectional view taken substantially on line 4—4 of Fig. 2;

Fig. 5 is a vertical sectional view through the cutting mechanism taken substantially on line 5—5 of Fig. 1;

Fig. 6 is a vertical sectional view through the cutting mechanism taken substantially on line 6—6 of Fig. 5;

Fig. 7 is a horizontal sectional view through the template cutting unit taken substantially on line 7—7 of Fig. 6;

Fig. 8 is a longitudinal sectional view of the approach roller conveyor taken substantially on line 8—8 of Fig. 1;

Fig. 9 is a longitudinal sectional view of the take-off roller conveyor taken substantially on line 9—9 of Fig. 1;

Fig. 10 is a plan view of the means for bringing the template cutting unit to a stop at the completion of its cutting cycle;

Fig. 11 is a vertical sectional view through the template cutting unit stop means, taken substantially on line 11—11 of Fig. 1;

Fig. 12 is a detail sectional view taken substantially on line 12—12 of Fig. 2, showing the means for limiting the downward movement of the cutting table;

Fig. 15 is a side view of the rotatable drum which controls the operation of the various parts of the machine;

Fig. 16 is a vertical sectional view taken substantially on line 16—16 of Fig. 15 showing the means for controlling the rotation of the drum;

Fig. 17 is an electrical wiring diagram of the means for controlling the rotation of the drum; and Fig. 18 is an electrical wiring diagram illustrating the operation of the various parts of the machine.

General statement

Figure 13:
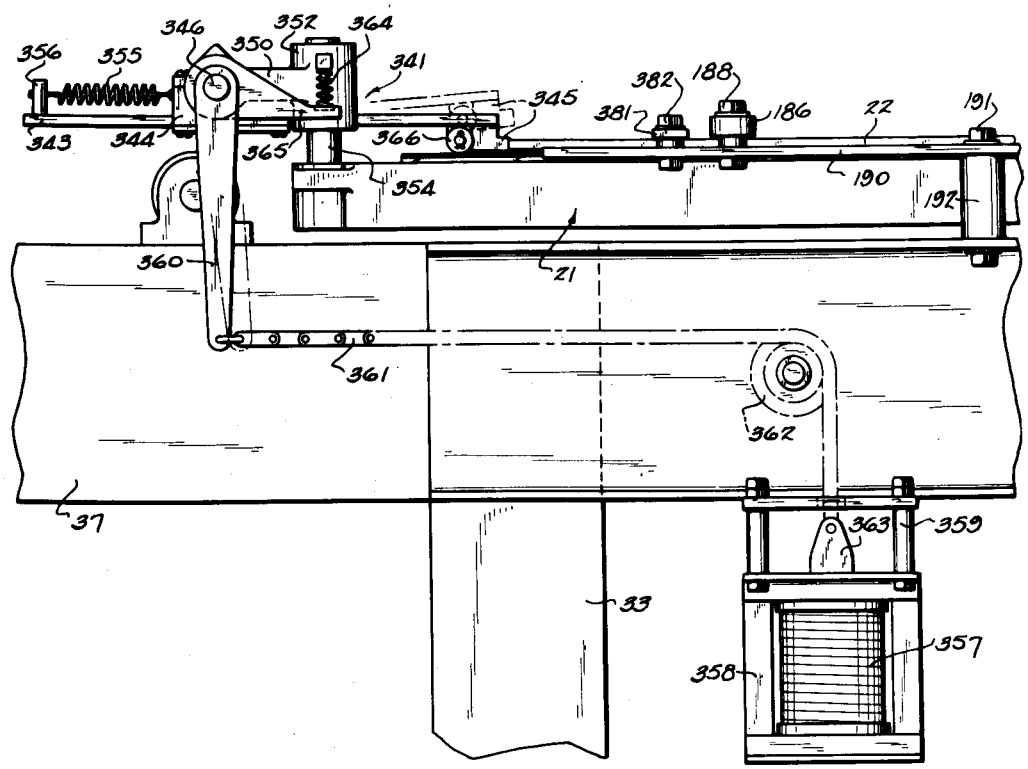
Fig. 13 is a side elevation of the means positioned at the forward end of the cutting table for limiting the forward movement of the sheet.

Briefly, the cutting machine of this invention comprises a table supporting structure 20 having associated therewith a flat, horizontal top 21 for supporting the glass sheet 22 during the cutting thereof. Arranged above the table top 21 in vertically spaced relation thereto is a horizontal track template 23 having the same configuration as the form or section to be cut from the glass sheet. Mounted upon the track template 23 and guided thereby is a power driven cutting unit 24 (hereinafter termed the template cutting unit) and which includes a rotatable steel cutting wheel 25 (Figs. 5 and 6), said unit being adapted to travel around the template 23 to score the glass sheet 22 along the score line indicated at 26 (Fig. 1) in the form of a complete windshield. Mounted beneath and carried by the table top 21, intermediate the ends thereof, is a second power driven cutting unit 27 (hereinafter termed the cross cutting unit) and which includes a rotatable steel cutting wheel 28 (Figs. 5 and 6), said unit being movable in a straight path transversely of the table to cut the complete windshield in half along the line 29 (Fig. 1) to form two similar half windshields.

The cutting units 24 and 27 are operated in timed relation to each other so that the transverse cut 29 is made simultaneously with and during the cutting of the sheet along the line 26. The cutting tool 25 of the template cutting unit 24 is arranged to travel through a closed path while the cutting tool 28 of the cross cutting unit 27 is movable along a straight path and intersects the closed path of the cutting tool 25 at two opposed points.

In accordance with the invention, means is provided for automatically raising the table top 21 and glass sheet supported thereon just prior to the cutting operation and for maintaining them in elevated position during the said cutting operation, upon the completion of which the said table and sheet are automatically lowered. The machine further embodies an approach roller conveyor 30 (Figs. 1 and 8) operable automatically to feed the glass sheets onto the cutting table and a take-off roller conveyor 31 (Figs. 1 and 9) for receiving the sheets from the table subsequent to cutting. Means is also provided for accurately positioning the glass sheets upon the table and for preventing accidental displacement thereof during cutting as well as means for first slowing up the travel of the template cutting unit and then bringing the same to a stop at the completion of its cutting cycle. A common electrical control means is also incorporated in the machine for automatically controlling the operation of the various parts thereof. In addition to the above, the machine embodies various other novel features of construction, arrangement and operation which will be more fully hereinafter described.

Cutting table construction

As stated above, the cutting table comprises a supporting structure 20 and a vertically movable top 21 carried thereby. The supporting structure 20 is illustrated in Figs. 1 to 4 of the drawings and includes a substantially rectangular framework provided at each end with a pair of spaced vertical legs 32 and 33, connected together adjacent their upper ends by a horizontal cross member 34 and adjacent their lower ends by a similar cross member 35. The legs 32 and 33 project upwardly beyond the cross members 34 and supported upon the upper ends thereof are the two longitudinally extending channel beams 36 and 37 positioned at opposite sides of the table. Arranged transversely of and secured to the channel beams 36 and 37 at the opposite ends of the table are the connecting channel members 38 and 39 and rotatably carried by the said channel members and extending longitudinally of the table are the spaced parallel shafts 40 and 41.

Fixed to the shaft 40 adjacent its opposite ends are the two bell-crank levers 42 and 43, each comprising a substantially vertical depending leg 44 and a substantially horizontal shorter leg 45. Keyed to the shaft 41, opposite the bell-crank levers 42 and 43 on shaft 40, are similar bell-crank levers 46 each comprising a substantially vertical depending leg 47 and a substantially horizontal shorter leg 48.

The table top 21 is substantially rectangular in plan and has secured to the underside thereof, adjacent its opposite ends, brackets 49 and 50 to which the substantially horizontal legs 45 of bell-crank levers 42 and 43 are pivoted as at 51, while the substantially horizontal legs 48 of bell-crank levers 46 are pivoted as at 52 to similar brackets 53 also carried upon the underside of the table top.

The depending legs 44 of bell-crank levers 42 and 43 are connected together at their lower ends by a horizontal rod 54 and a similar rod 55 connects the lower ends of the depending legs 47 of bell-crank levers 46. The parallel rods 54 and 55 are in turn connected together at their opposite ends by horizontal links 56 and 57 so that all of the bell-crank levers will operate in unison. Fastened to the rod 55 at each end thereof is one end of a tension spring 58 fastened at its opposite end to a horizontal plate 59 secured to the supporting framework. The springs 58 tend to normally urge the bell-crank levers in a counterclockwise direction to raise the table top 21 but they are not of sufficient strength to alone effect such raising. The purpose of these springs will be more clearly hereinafter described.

The means for raising the table top 21 comprises a pair of solenoids 60 and 61, each being carried by a frame 62 suspended from a longitudinally extending horizontal plate 63 by hangers 64. The plate 63 is carried at its opposite ends by hangers 65 and 66 secured to the horizontal angle beams 67 and 68 respectively extending transversely of the table and secured to the longitudinally extending channel beams 36 and 37. Keyed to the shaft 41 are two substantially horizontal lever arms 69 and 70 to the outer ends of which are pivoted, as at 71 and 72, the vertical depending links 73 and 74 respectively pivotally connected at their lower ends, as at 75 and 76, to the vertical plungers 77 and 78 of the solenoids 60 and 61 respectively.

When it is desired to raise the table top 21, the solenoids 60 and 61 are energized to draw the plungers 77 and 78 thereof downwardly, thereby rocking the shaft 41 in a counter-clockwise direction and causing all of the bell-crank levers to operate in unison. The raising of the table top by the solenoids will be assisted by the action of the springs 58 which, as pointed out above, are always tending to raise the table but are not of sufficient strength to actually effect such raising. However, they do materially assist in the table raising upon energization of the solenoids. Upon de-energization of the solenoids 60 and 61, the weight of the table will cause it to be lowered against the action of the springs 58. For the purpose of limiting the downward movement of the table, there is provided a pair of horizontal straps 79 and 80 (Figs. 2 and 12) arranged at opposite ends of the rod 55 and each having a slot 81 therein through which the said rod passes. Each strap is carried by an angle bracket 82 secured to the plate 59, being secured to the said bracket by a bolt 83 passing through a slot 84 in said strap. Upon raising of the table top, the rod 55 moves forwardly in the slots 81 of the straps whereas when the table top is lowered, the rod 55 engaging the rear end walls of the slots serves to limit the downward movement thereof. Due to the provision of the slots 84 in the straps 79 and 80, the said straps can be adjusted horizontally to regulate the downward movement of the table top.

Extending longitudinally of the supporting framework 20 and carried upon the transverse angle beams 67 and 68 are the angle members 85 and 86 to which are secured a plurality of spaced pairs of vertical bearing straps 87 and 88 which rotatably carry at their upper ends rollers 89, 90, 91, 92, 93 and 94 which operate within transverse openings 95 to 100 respectively formed in the top of the table. The rollers 89, 90 and 92 are mounted to freely rotate, while the rollers 91, 93 and 94 are positively driven. The drive for the rollers 91 and 93 includes a transverse shaft 101 (Fig. 3) rotatable in spaced bearings 102 and 103 carried respectively by the angle member 85 and a parallel angle member 104. Keyed to one end of the shaft 101 is a sprocket wheel 105 about which is trained a sprocket chain 106 also passing around a sprocket wheel 107 keyed to the roller 91. A second sprocket wheel 108 is also fixed to shaft 101 and has trained thereabout a sprocket chain 109 also passing around a sprocket wheel 110 carried by roller 93.

The shaft 101 is driven from a drive shaft 111 through the intermeshing spiral gears 112 and 113, said shaft 111 extending longitudinally of the cutting table and being rotatably supported at each end in a bearing 114 (Fig. 9) carried by an angle iron 115. The shaft 111 may be driven from a suitable source of power through a sprocket and chain drive 116 or in any other preferred manner. From the above, it will be seen that upon rotation of the shaft 111, the shaft 101 will be driven through the intermeshing gears 112 and 113 to effect rotation of the rollers 91 and 93 through the sprocket chains 106 and 109. The means for driving the roller 94 includes a transverse shaft 117 journaled in spaced bearings 118 carried by the angle members 85 and 86 and driven from the drive shaft 111 through the intermeshing spiral gears 119 and 120 (Fig. 9). Keyed to the shaft 117 is a sprocket wheel 121 and trained about said wheel is a sprocket chain 122 also passing around a sprocket wheel 123 carried by roller 94. The rollers 91, 93 and 94 are preferably continuously driven at all times.

During the feeding of the glass sheet 22 to be cut onto the cutting table from the approach runway 30, the table top 21 is in lowered position, at which time the rollers 89 to 94 project upwardly slightly beyond the upper surface of the said table top, as shown in Fig. 2, to receive the glass sheet thereon. The sheet is carried forwardly by the driven rollers 91, 93 and 94 to the desired position on the table where it is brought to a stop. The table top 21 is then raised into cutting position whereupon the glass sheet will be transferred from the rollers to the stationary top of the table. The cutting of the sheet is then effected after which the table top is lowered to again bring the glass sheet to rest on the rollers 89 to 94 whereupon the rollers 91, 93 and 94 will deliver the sheet from the table onto the take-off conveyor 31, during which time another sheet is being fed onto the rollers from the approach conveyor 30.

*Approach and take-off conveyors*

The approach conveyor 30, which is arranged at the forward end of the machine and which is adapted to feed the glass sheets to be cut onto the cutting table comprises a plurality of horizontally aligned rolls 124, while the take-off conveyor 31, which is arranged at the opposite end of the machine, and which is adapted to receive the cut sheets from the table comprises a plurality of horizontally aligned rolls 125. The rolls 124 and 125 are in horizontal alignment with one another and also with the rollers 89 to 94 inclusive.

The approach runway 30 is best illustrated in Figs. 1 and 8 and the rolls 124 thereof are carried by shafts 126 journaled at their opposite ends in bearings 127 and 128 mounted on the longitudinally extending channel beams 129 and 130 which align with and constitute, in effect, extensions of the channel beams 36 and 37 respectively at opposite sides of the cutting table. The take-off runway 31 is best illustrated in Figs. 1 and 9 and the rolls 125 thereof are carried by shafts 131 journaled at opposite ends in bearings 132 and 133 mounted on the longitudinally extending channel beams 134 and 135 which also align with and constitute, in effect, extensions of the channel beams 36 and 37.

The rolls 125 of the take-off conveyor are adapted to be continuously driven at all times from the drive shaft 111 and to this end there is carried by the channel beam 135 a pair of horizontally spaced bearings 136 and 137 in which is journaled a short shaft 138 having keyed at its opposite ends spiral gears 139 and 140 meshing with spiral gears 141 and 142 respectively fixed to the shafts 131 of two adjacent rolls 125. Fixed to the shaft 111 is a sprocket wheel 143 about which is trained a sprocket chain 144 also trained about a sprocket wheel 145 keyed to shaft 138. Each of the roll shafts 131 carries a sprocket wheel 146 and running over these sprockets is a sprocket chain 147 so that upon rotation of the shaft 138, all of the rolls 125 will be driven in unison.

The rolls 124 of the approach conveyor 30 are intermittently driven and are caused to rotate only during the time the glass sheets are being fed onto the cutting table. The drive for the rolls 124 is substantially the same as that for the rolls 125 of the take-off conveyor 31, with the exception that means is provided for automatically starting and stopping the rotation of the rolls 124 at predetermined intervals. The drive for these rolls comprises a horizontal platform 148 supported by posts 149 and having mounted thereon a vertical frame 150 and a bearing bracket 151. The frame 150 consists of a pair of spaced vertical side members 152 and 153 connected at their upper ends by a cross rod 154. The numeral 155 designates a horizontal drive shaft journaled at one end in the bearing bracket 151 and at its opposite end in the side member 153 of frame 150.

Mounted upon the shaft 155 is a friction clutch, designated in its entirety by the numeral 156 and comprising a sleeve 157 keyed to the shaft 155 and a second sleeve 158 loose on said shaft. The sleeves 157 and 158 carry at their inner adjacent ends discs 159 and 160 respectively which frictionally engage one another. The sleeve 157 is continuously driven at all times from a suitable source of power through a chain and sprocket drive or the like 161, while the rolls 124 are intermittently driven from the sleeve 158 through a sprocket chain 162 trained about a sprocket wheel keyed to the said sleeve and also about a sprocket wheel 163 fixed to a short horizontal shaft 164 journaled in spaced bearings 165 and 166 secured to the channel beam 130. Keyed to the opposite ends of the shaft 164 are spiral gears 167 and 168 which mesh with spiral gears 169 and 170 respectively fixed to the shafts 126 of two adjacent rolls 124. Each of the roll shafts 126 has keyed thereto a sprocket 171 and trained about these sprockets is a sprocket chain 172 so that upon rotation of the shaft 164, all of the rolls 124 will be driven in unison.

During the operation of the cutting machine, the sleeve 158 is periodically moved along shaft 155 to cause the disc 160 carried thereby to alternately engage and disengage the disc 159 on sleeve 157. When the two discs are in frictional engagement with one another, the sleeve 158 will be driven from the sleeve 157 to effect rotation of the rolls 124. On the other hand, when the discs 159 and 160 are disengaged, rotation of the sleeve 158 will stop, so that the drive to the rolls will be broken.

The sliding of the sleeve 158 along shaft 155 to disengage the discs 159 and 160 is controlled by a solenoid 173 carried in a frame 174 suspended from the platform 148 by hangers 175. The numerals 176 and 177 designate a pair of toggle links which are pivotally connected together at their inner ends as at 178 to a depending link 179 pivoted at its lower end at 180 to the vertically movable plunger 181 of the solenoid 173. The toggle link 176 is pivoted at its outer end as at 182 to the side member 152 of frame 150, while the toggle link 177 is pivotally connected at its outer end as at 183 to a collar 184 loosely mounted in a circumferential groove 183' formed in the sleeve 158. The toggle links 176 and 177 are normally drawn upwardly by a tension spring 185 and this spring serves to maintain the toggle links in the position indicated in full lines in Fig. 8, at which time the discs 159 and 160 are in engagement with one another so that the rolls 124 are rotating. This condition will be maintained until the solenoid 173 is energized whereupon the downward movement of plunger 181 will cause the toggle links to assume the position indicated by the broken lines and when this occurs the sleeve 158 will be drawn outwardly along shaft 155 to disengage disc 160 from disc 159, thereby breaking the drive to the rolls. As soon as the solenoid is again de-energized, the action of the spring 185 will automatically cause the discs 159 and 160 to be engaged to drive the rolls 124.

Template

The template 23 for supporting and guiding the cutting unit 24 preferably comprises a relatively narrow continuous track of the desired shape and size supported horizontally above the cutting table by a plurality of substantially horizontal supporting arms 186 provided at their outer ends with slots 187 (Fig. 1) through which pass the bolts or other fastening elements 188. These fastening elements serve to secure the arms 186 to the metal strips 189 and 190 extending longitudinally at opposite sides of the table and carried by the channel beams 36 and 37 respectively. The strips 189 and 190 are secured to said channel beams by bolts 191 and are held spaced thereabove by collars 192 (Fig. 13) through which the said bolts pass. The template 23 is secured to the inner ends of the arms 186 by bolts or the like 193 and by reason of the slots 187 in arms 186, the said arms can be adjusted to accommodate templates of different shapes and sizes.

Template cutting unit

As shown in Fig. 1, the cutting unit 24 is carried at the outer end of a horizontal supporting arm 194 hinged at its inner end at 195 to a second horizontal arm 196 which is pivoted at 197 to a bracket 198 mounted upon a platform 199 carried by the supporting framework of the machine.

With reference particularly to Figs. 1, 5, 6 and 7, the cutting unit 24 comprises a housing 200 provided with a removable top plate 201 secured in place by screws or the like 202. Fastened to the top plate 201 by screws 203 is a vertical bushing 204 which is rotatably mounted in a bearing 205 formed at the outer end of the supporting arm 194, said bushing 204 projecting above said bearing and having threaded thereon a nut 206 which serves to secure the cutting unit to the supporting arm.

Formed in the housing 200 is a horizontal rectangular bore 207 closed at one end by a removable cap 208 and being open at its opposite end. Loosely received within the bore 207 is an elongated bar 209 projecting through the open end of said bore and provided at its outer end with a head 210. The head 210 is formed at its lower end with a dove-tailed rib 211 (Fig. 6) and carried thereby is a horizontal plate 212 provided in its upper surface with an undercut groove 213 (Fig. 6) receiving therein the rib 211. The plate 212 is provided at its outer end with a well 214 in which is received the cylindical cutter holder 216, said holder having a depending reduced portion 217 projecting through an opening 218 in the bottom of said well and carrying the rotatable steel cutting wheel 25.

The opposite side walls of the well 214 are provided with aligned vertical slots 219 and carried by the cutter holder 216 are horizontal pins 220 which project outwardly through said slots. Pivoted to the end of the plate 212 remote from well 214, as indicated at 221 in Fig. 5, is a lever 222 bifurcated at its outer end to provide the spaced legs 223 which straddle the well 214 and engage the pins 220, said lever acting to urge the cutting wheel 25 downwardly into engagement with the glass sheet.

The head 210 is provided with a vertical opening 224 in which is mounted a vertical pressure pin 225, said pin projecting downwardly through an opening 226 in the plate 212 and engaging the lever 222. Threaded within the upper end of the opening 224 is a nut 227 while formed upon the pressure pin 225 adjacent the lower end thereof is an annular flange 228. Arranged within the opening 224 and encircling pressure pin 225 are the two concentric compression springs 229 which bear at their upper ends against the nut 227 and at their lower ends against the flange 228, thereby acting to normally urge the pin 225 downwardly to engage the lever 222. With this construction, the cutting wheel 25 will be yieldably maintained in engagement with the glass sheet and the pressure of the cutting wheel upon the glass can be regulated by proper adjustment of the nut 227 to control the compression of the springs 229. The plate 212 may be adjusted horizontally relative to head 210 to vary the position of the cutting wheel 25 by means of a set screw 230 which passes through a boss 231 on the plate 212 and engages the head 210.

Carried by the head 210 is a freely rotatable guide roller 232 mounted upon the vertical stub shaft 233 and adapted to engage one vertical side edge of the template 23. Carried by the housing 200 and adapted to engage the opposite vertical side edge of the template are the spaced guide rollers 234 and 235, the roller 232 engaging the template at a point intermediate the two rollers 234 and 235. The roller 234 is also freely rotatable and is mounted upon a screw 236 threaded at its upper end in an opening 237 in the housing 200, said screw being provided at its lower end with a flange 238 for holding the roller in place. The roller 235 is positively driven and to this end is fixed to a vertical shaft 239 by a key 240. The shaft 239 passes upwardly through a bushing 241 in the housing 200 and is received at its upper end in a bearing 242 set in the top plate 201. Arranged beneath the bushing 241 is an oil packing ring 243 and carried at the lower end of the shaft 239 is a nut 244 and washer 245 for maintaining the roller 235 in place.

The roller 235 is driven through a train of reducing gears arranged in the housing 200 and including a gear 246 mounted upon shaft 239 and supported upon the upper end of bushing 241, said gear being driven from a gear 247 mounted upon a stub shaft 248 disposed in substantial vertical alignment with the screw 236 supporting roller 234. The gear 247 is provided with a hub 249 upon which is mounted a third gear 250 and this gear is driven from a gear 251 keyed to a vertical stub shaft 252, said shaft being journaled at its opposite ends in bearings 253 and 254. The shaft 252 is provided with a reduced upper end 253' received within a bore 255 in a bearing 256 arranged within the bushing 204, said bearing being keyed to the reduced upper end of shaft 252 by screws or the like 257. Also received within the bore 255 in bearing 256 is one end of a flexible shaft 258 secured to the said bearing by set screws or the like 259. The flexible shaft 258 is connected at its opposite end with a motor 260 suspended a suitable distance above the cutting table. Upon operation of the motor 260, the flexible shaft 258 turning the bearing 256 will effect rotation of gear 251 and this rotary motion will then be transmitted to the guide roller 235 through the gears 250, 247 and 246 respectively. The positive rotation of the guide roller 235 will cause the cutting unit 24 to be driven around the template 23.

It is of course essential in the operation of the machine that the rotatable steel cutting wheel 25 be always maintained tangent to the line of cut if a satisfactory cut is to be made, and the same is equally true when using a cutting diamond instead of a rotatable steel wheel. The provision of the guide rollers 232, 234 and 235, together with the fact that the cutting wheel is prevented from rotating about an axis extending perpendicular to the glass sheet, serve to maintain the cutting edge of the wheel tangent to the line of cut as the cutting unit is propelled around the template.

The guide roller 232 is yieldably maintained in engagement with the template 23 by the action of a compression spring 261 which is arranged within the bar 209 and which encircles a rod 262 also arranged therein and formed at its inner end with a flange 263. The rod 262 projects at its outer end through a block 264 carried by the bar 209 and also through the cap 208, a nut 264' being threaded upon its outer end. The spring 261, bearing at its opposite ends against the flange 263 on rod 261 and the block 264 at the outer end of bar 209, serves to draw the said bar and head 210 outwardly so as to yieldably maintain the guide roller 232 in engagement with the template.

Stop means for template cutting unit

As brought out above, when the motor 260 is placed in operation, the cutting unit 24 will be driven around the track template 23, with the cutting wheel 25 scoring the glass sheet 22 along the line 26 in Fig. 1. It is preferred that the cutting unit be positively driven through only a portion of its cutting cycle and then permitted to coast the balance of its cycle. In order to reduce the shock of sudden stopping and the tendency of the cutting unit to rebound, the invention contemplates the provision of means for first reducing the speed of the cutting unit as it approaches the end of its cutting movement and then bringing the same to a stop and maintaining it in such position until it is desired to repeat the cutting operation.

The cutting unit stop means is best illustrated in Figs. 1, 5, 10 and 11 and comprises a horizontal plate 265 arranged at the front of the cutting table intermediate the ends thereof and secured to the longitudinally extending strip 189 by bolts or the like 266 and spaced therefrom by collars 267 through which said bolts pass. Carried by the plate 265 is a pair of opposed levers 268 and 269 pivoted thereto as at 270 and 271 respectively. Carried at the free ends of the levers 268 and 269 are depending pins 272 and 273 respectively which pass through slots 274 and 275 in the plate 265 and are connected by a tension spring 276 which functions to normally draw the levers 268 and 269 together.

Carried by and depending from the housing 200 of the cutting unit 24 is a stop pin 277 and as the cutting unit approaches the end of its cutting cycle or stroke, the stop pin passes between the levers 268 and 269 as indicated by the broken lines in Fig. 10, whereupon the frictional engagement of the said levers with the said pin will cause a slowing down of the cutting unit. Although this serves to cut down the speed of travel of the cutting unit, the said unit will, however, not be brought to a stop until the stop pin 277 passes beyond the said levers 268 and 269 and engages a stop bar 278 extending transversely of the cutting table and horizontally slidable through a guide block 279 carried by plate 265. The stop bar 278 is normally maintained in the path of travel of the stop pin 277 by a spring 280 fastened at one end to a post 281 on the block 279 and at its opposite end to a post 282 carried by stop bar 278. The inward movement of the stop bar is limited by a screw 283 threaded in block 279 and engageable by the post 282. By proper adjustment of the screw 283, the inward movement of the stop bar can be accurately regulated. The spring 280 serves to normally maintain the stop bar 278 in the position indicated in Fig. 10, so that after the pin 277 on the cutting unit passes from between the levers 268 and 269, it will engage the inner end 284 of said bar as shown by the full lines in Fig. 10 and bring the slowly moving cutting unit to a stop. The levers 268 and 269 are provided at their outer free ends with substantially semi-circular notches 285 and 286 in which the stop pin 277 is received when the cutting unit is brought to a stop and by means of which rebound of the cutting unit is prevented.

It will be evident from the above that the stop bar 278 will not only act to bring the cutting unit to a stop but will also prevent further movement of the unit until the said bar is moved out of the path of travel of the stop pin 277. This is adapted to be automatically accomplished at the proper time in the operation of the machine by a solenoid 287 (Fig. 11) carried by a frame 288 supported by an angle bracket 289 secured to the channel beam 36. Also secured to the channel beam 36 is a bracket 290 to which is pivoted as at 291 a bell-crank lever 292 comprising a substantially vertical leg 293 and a substantially horizontal leg 294, said horizontal leg having pivoted at its outer end as at 295 a vertical link 296 pivotally connected at its lower end at 297 to the vertically movable plunger 298 of the solenoid 287. The vertical leg 293 of bell-crank lever 292 is adapted to engage a hooked portion 299 formed at the outer end of the stop bar 278. When the solenoid 287 is energized, the plunger 298 thereof will be drawn downwardly to rock the bell-crank lever 292 in a counter-clockwise direction about its pivot 291 whereupon the vertical leg 293 of said lever, engaging the hooked portion 299 of stop bar 278, will draw the said bar out of engagement with the stop pin 277 on the cutting unit, thereby permitting movement of the unit around the template 23. Upon de-energization of the solenoid 287, the tension of the spring 280 will be sufficient to again move the stop bar inwardly so that it will be in position to stop the cutting unit upon the completion of its cutting stroke.

*Cross cutting unit*

The cross cutting unit 27 is best illustrated in Figs. 1, 2, 3, 5 and 6. This unit is preferably supported beneath and carried by the table top 21 and is adapted to cut in half the form or section cut out of the glass sheet by the template cutting unit 24. For instance, when cutting half windshields, the cutting wheel 25 of cutting unit 24 serves to score the glass sheet through a continuous closed path forming the outline of the complete windshield, while the cutting wheel 28 of cutting unit 27 serves to score the sheet transversely along a straight path which intersects the closed path of the cutting wheel 25 at opposed points and cuts the complete windshield in half to form two similar half windshields. In mounting the cross cutting unit, the table top 21 is provided intermediate its ends with a transverse opening or slot 300 and secured to the underside of the table, at opposite sides of said opening, are spaced rails 301 and 302 along which the cutting unit 27 is adapted to travel, said rails being secured to the table by screws 303. The cutting unit 27 comprises a housing 304 provided at one side with a pair of spaced wheels 305 riding upon the top of rail 301 and a pair of similar wheels 306 engaging the bottom of said rail, said wheels being preferably received within grooves or channels in the rail to prevent lateral movement of the cutting unit. Carried at the opposite side of the housing is a pair of wheels 307 engaging the upper surface of rail 302.

The cutter housing 304 is provided with a vertical bore 308 in which is slidably received a cutter holder 309 carrying the cutting wheel 28 at its upper end. The bore 308 is enlarged at its lower end as at 310 and has threaded therein a nut 311. The cutter holder 304 is provided with a downwardly opening recess 312 and arranged therein is a compression spring 313 bearing at its upper end against the holder 309 and at its lower end against nut 311, said spring serving to normally urge the holder upwardly to maintain the cutting wheel 28 in yieldable engagement with the bottom surface of the glass sheet. For the purpose of limiting the upward movement of the cutting wheel, there is inserted transversely through the holder 309 a horizontal pin 314, the projecting ends of which are received in slots 315 in the housing 304 and engage screws 316 carried at the upper end of said housing. From the above, it will be apparent that upon raising or lowering of the table top 21, the cross cutting unit 27 will be raised and lowered therewith.

The cross cutting unit 27 is adapted to be positively driven along the rails 301 and 302, and this may be effected by drive means, best illustrated in Figs. 2, 3, 5 and 14, said means including a sprocket chain 316 connected to the opposite ends of the cutting unit 27 (Fig. 5), with the chain being trained about a sprocket wheel 317 at the front of the cutting table, a sprocket wheel 318 at the rear of said table, and a sprocket wheel 319 beneath the table (Fig. 3). The sprocket wheels 317, 318 are suitably carried by the channel beams 36 and 37 respectively while the sprocket wheel 319 is loosely mounted upon a shaft 320 constituting a part of a gear reduction mechanism located in the housing 321 and driven from a reversible motor 322 through a sprocket and chain drive or the like 323. The gear reduction housing 321 is hung from a bracket 324 carried by the angle beam 68.

Figure 14:
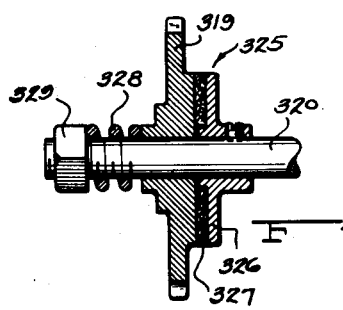
Fig. 14 is a detail sectional view, taken substantially on line 14—14 of Fig. 3, of the drive for the cross cutting unit.

The sprocket wheel 319 constitutes part of a friction clutch 325, the construction of which is best illustrated in Fig. 14. The clutch also includes a metal disc 326 keyed to the shaft 320 and having on its inner face a friction disc 327. The sprocket wheel 319 is normally maintained in frictional engagement with the disc 327 by a compression spring 328 encircling the shaft 320 and held thereon by a nut 329. The reversible motor 322 is adapted to be in continuous operation, driving the shaft 320 and disc 326 first in one direction and then the other. Upon rotation of the shaft 320, the sprocket wheel 319 will also be driven due to its frictional engagement with the disc 327, thereby causing the cutting unit to travel first in one direction and then the other transversely of the cutting table. The cross cutting unit is adapted to travel in alternate directions across successive sheets to be cut. That is to say, the cutting unit does not travel across the table first in one direction and then the other during the cutting of each sheet of glass, but instead travels in one direction during the cutting of one sheet and then in the opposite direction upon cutting of the next sheet. When the cutting unit reaches the end of its cutting stroke in either direction, it is adapted to engage a stop member 330 (Fig. 5) carried by the table. While this member will bring the cutting unit to a stop, the motor 322 will continue to operate, during which time the disc 327 will be permitted to turn or slip relative to the sprocket wheel 319. When it is desired to cut another sheet, the motor is reversed whereupon the sprocket wheel 319 will again be driven to move the cutting unit in the opposite direction.

*Sheet guiding and positioning means*

This invention also comprehends the provision of novel means for automatically effecting the accurate positioning of the glass sheet 22 upon the cutting table as it is delivered thereon from the approach conveyor 30. As shown in Fig. 1, the table top 21 is provided along one side thereof with a plurality of sheet edge engaging guide rollers 331 mounted in fixed horizontal alignment with one another and freely rotatable upon pins 332, while arranged along the opposite side of the table is a plurality of aligned guide rollers 333 which engage the opposite edge of the sheet and are spring-pressed into engagement therewith. Thus, each roller 333 is mounted to freely rotate upon a pin 334 carried at one end of a bell-crank lever 335, said lever being pivoted intermediate its ends at 336 to a plate 337 secured to the table by screws 338 passing through slots 339. Fastened to the opposite end of the bell-crank lever 335 is a tension spring 340 which serves to normally urge the roller 333 inwardly into engagement with the edge of the sheet. With this arrangement, as the glass sheet is received between the rollers 331 and 333, the rollers 333 will act to hold the sheet in engagement with the rollers 331 and thereby maintain the sheet in proper position. There is also provided at the forward end of the cutting table means, designated generally by the numeral 341, for limiting the forward movement of the glass sheet upon said table and for bringing the said sheet to a stop when it reaches the desired predetermined position thereon, while means, designated generally by the numeral 342, is arranged at the opposite end of the cutting table for preventing undue rebound of the sheet when it engages the stop means 341.

The stop means 341 comprises a horizontal strip 343 slidable through a block 344 and provided at its inner end with a plate 345 engageable by the forward edge of the glass sheet. The block 344 is mounted upon a transverse bar 346 having cylindrical end portions passing through horizontal bearings 347 and 348 carried by arms 349 and 350 provided at their inner ends with vertical bearings 351 and 352 mounted upon vertical pins 353 and 354 respectively carried by the table top. The bar 346 is mounted for rocking movement and upon turning of the bar in a clockwise direction (Fig. 1), the inner end of the strip 343 and plate 345 will be lifted upwardly out of engagement with the glass sheet as shown by the broken lines in Fig. 13, thereby permitting the sheet to pass off the table. However, when the plate 345 is in lowered position as shown by the full lines in Fig. 13, it is disposed in the path of travel of the glass sheet. The said stop plate is in this position when the glass sheet is fed onto the cutting table and upon engagement of the forward edge of the sheet with the plate, the said sheet will be brought to a stop. The plate 345 is normally urged inwardly by a spring 355 fastened at one end to the block 350 and at its opposite end to a post 356 on strip 343.

The means for lifting the stop plate 345 out of the path of travel of the glass sheet subsequent to the cutting operation to permit the removal of said sheet from the cutting table includes a solenoid 357 carried by a frame 358 suspended from the supporting framework by hangers 359. Secured to one end of the bar 346 is a depending link 360 and fastened to the lower end of said link is one end of a sprocket chain 361, said chain passing over a sprocket wheel 362 and being connected at its opposite end to the vertically movable plunger 363 of solenoid 357. When the solenoid is energized, the plunger 363 thereof will be drawn downwardly, thereby swinging the link 360 to the right (Fig. 13) to rock the bar 346 in a counter-clockwise direction to effect the raising of the stop plate 345 out of engagement with the sheet. Upon de-energization of the solenoid, the said stop plate will be automatically lowered to sheet engaging position by the downward pressure of springs 364 engaging ears 365 fixed to the bar 346. It is preferred, in the operation of the machine, that the stop plate 345 be only momentarily raised at the completion of the cutting operation to permit the forward edge of the sheet to pass therebeneath, after which the said plate is lowered to rest upon the glass. In order to facilitate the passage of the sheet from the cutting table, relatively small rollers 366 can be carried by the strip 343 to ride along upon the upper surface of the glass sheet as the said sheet is delivered from the table.

When the forward edge of the glass sheet engages the stop plate 345, the sheet will move the strip 343 slightly outwardly against the action of the spring 355. The sheet will, however, be brought to a stop when the compression of the spring overcomes the force of the sheet. When this occurs, there may be a slight rebound of the sheet and the stop means 342 is provided to prevent or limit this rebound. The stop means 342 is similar to stop means 341 and also includes a strip 367 passing horizontally through a block 368 and secured thereto by a set screw 369. The block 368 is mounted upon a transverse bar 370 having cylindrical end portions which are received in horizontal bearings 371 and 372 having formed integral therewith horizontal arms 373 and 374 provided at their opposite ends with vertical bearings 375 and 376 mounted on pins 377 and 378 carried by the table top 21. The strip 367 is provided at its inner end with a stop plate 379 and also with the sheet engaging rollers 380. As the glass sheet is fed onto the cutting table from the approach conveyor 30, the said sheet initially engages the rollers 380, causing the plate 379 to be lifted upwardly, whereby to permit the movement of the sheet onto the cutting table, and during the passage of the sheet onto said table, the rollers 380 ride along upon the upper surface of said sheet. As soon as the rear edge of the sheet passes beyond the stop plate 379, the said plate falls downwardly to prevent or limit rearward movement of the glass sheet when it engages the stop means 341 at the forward end of the table. It will thus be clearly seen that means is provided for accurately positioning the glass sheet upon the cutting table automatically and without any assistance from the operator. In order to prevent slippage of the sheet upon the table top during cutting, a plurality of preferably spring fingers 381 are carried by the metal side strips 189 and 190 and are adapted to engage the upper surface of the sheet upon the raising of the table top. The fingers 381 are secured to the side strips 189 and 190 by screws or bolts 382 passing through slots 383 in said fingers.

Control drum

The operation of the various parts of the machine is controlled by a common control means in the form of a rotatable drum 384, and upon reference particularly to Figs. 15 to 18 inclusive, it will be seen that the control drum is provided circumferentially thereof with a plurality of spaced contact strips 385 to 390 inclusive, said strips being of different lengths so that they extend different distances around the drum. Extending longitudinally of the drum is a rod 391 and loosely mounted upon this rod are the six substantially L-shaped contact levers 392 to 397 inclusive which cooperate respectively with the six contact strips 385 to 390. The contact levers 392 to 397 are provided at their upper inner ends with rollers 398 to 403 inclusive adapted to engage the contact strips 385 to 390 respectively, while the lower outer ends of said levers cooperate with stationary contacts to provide switches 404 to 409 respectively. When the rollers 398 to 403 are in engagement with the respective contact strips 385 to 390, the switches 404 to 409 are closed, whereas when the said rollers pass out of engagement with the contact strips, the switches are automatically opened by rocking of the levers 392 to 397 upon the rod 391. Thus, it will be seen that the length of time each switch 404 to 409 is caused to remain closed during each rotation of the drum 384 depends upon the length of the respective contact strip 385 to 390.

The drum 384 is loosely mounted upon a horizontal shaft 410 journaled at its opposite ends in bearings 411 and 412 and positively driven at all times from a suitable source of power through a chain and sprocket drive or the like 413. The drum 384 is connected with and driven from the shaft 410 through a friction clutch designated in its entirety by the numeral 414. This clutch comprises a metal disc 415 keyed to the shaft 410 and having on its inner face a friction disc 416. Carried by the drum 384 is a metal disc 417 yieldably maintained in engagement with the friction disc 416 by a plurality of springs 418. Ordinarily, the disc 417 will be held against disc 416 with sufficient pressure to cause the drum 384 to be driven from the shaft 410. On the other hand, however, the rotation of the drum can be stopped while the shaft continues to rotate, at which time the discs 416 and 417 will slip relative to one another. The purpose of this construction will be more clearly hereinafter apparent.

According to the invention, the drum 384 is adapted to rotate one complete revolution during each cutting cycle. The drum, however, does not rotate continuously but instead is driven one-half a revolution and then momentarily brought to a stop, after which it is again rotated one-half a revolution and stopped. The means for controlling the rotation of the drum is best illustrated in Fig. 16. As here shown, the drum is provided at one end thereof and at diametrically opposite points with two lugs 419 and 420, and cooperating with these lugs is a stop member 421 carried at the outer end of a bell-crank lever 422 pivoted intermediate its ends as at 423 to a bracket 424 mounted upon a platform 425. Suspended beneath the platform by hangers 426 is a frame 427 carrying a solenoid 428, the vertically movable plunger 429 of which has pivotally connected thereto a vertical link 430 pivoted at its upper end as at 431 to the outer end of the bell-crank lever 422.

The bell-crank lever 422 is normally urged in a counter-clockwise direction by means of a spring 432 to maintain the stop member 421 in the path of travel of the lugs 419 and 420. However, upon energization of the solenoid 428, the bell-crank lever will be rocked in a clockwise direction against the action of the spring 432 whereupon the stop member 421 will be withdrawn from the path of travel of the lugs 419 and 420, permitting the drum to rotate. As indicated by the full lines in Fig. 16, the stop member 421 is engaged by the lug 419, thereby preventing rotation of the drum 384 and at this time the solenoid 428 is de-energized. However, when the solenoid 428 is energized, the stop member 421 will be moved to the broken line position out of engagement with lug 419, whereupon the drum will be permitted to again rotate. After the lug 419 has passed beyond the stop member 421, the solenoid is adapted to be again de-energized to return the stop member to full line position where it will be engaged by the lug 420 when the drum has completed one-half a revolution. When the lug 420 engages stop member 421, the drum will again be brought to a stop and will remain stationary until the solenoid 428 is again energized. The drum may therefore be said to rotate intermittently one-half a complete revolution and the advantage of driving the drum in this manner will be more clearly hereinafter apparent.

Operation and electrical wiring of machine

In the operation of the machine, the glass sheet 22 to be cut is first placed upon the approach runway 30 and delivered thereby onto the cutting table. When the glass sheet is delivered onto the cutting table, the table top 23 is in lowered position as shown in Fig. 2 so that the sheet is received and supported upon the rollers 89 to 94. As soon as the sheet engages the driven roller 91, the said roller will then serve to carry the sheet forwardly until the forward edge thereof engages the stop plate 345 of the sheet stop means 341 which, as brought out above, limits the forward movement of the sheet upon the table. When the sheet engages the stop means 341, the strip 343 thereof will be forced outwardly against the action of the spring 355 to cause the solenoid 428 (Fig. 16) to be energized to remove the stop member 421 from the path of travel of the lug 419 and permit the rotation of the control drum. To this end, there are provided the two contacts 433 and 434 carried by the strip 343 and block 344 respectively, the contact 433 being connected by a wire 435 (Fig. 17) to the positive main line 436, while leading from the contact 434 is a wire 437 connected to a wire 438 running to the solenoid 428 and leading from the said solenoid is a wire 439 connected with the negative main line 440. It will thus be seen that when the forward edge of the sheet engages strip 343, moving it against the action of spring 355, the contacts 433 and 434 will be engaged with one another and that during this time a circuit will be completed through the solenoid 428 to effect the energization thereof. Further, that upon energization of the solenoid, the stop member 421 will be moved out of engagement with lug 419 permitting the rotation of the control drum. The circuit through the solenoid 428 will be only momentarily completed since the spring 355, upon being compressed, will again force the strip inwardly to move the contact 343 away from contact 344.

When the control drum 384 is in the position shown in Fig. 16, none of the rollers 398 to 403 carried by the contact levers 392 to 397 are in engagement with the contact strips 385 to 390 as will be clearly seen in Fig. 18, so that all of the switches 404 to 409 are open. However, when the drum is started to rotate, the various contact strips will be brought into engagement with the rollers on the contact levers to effect the operation of the different parts of the machine in the proper sequence. As brought out above, the drum is not permitted to rotate until the sheet is properly positioned upon the cutting table. When the sheet is, however, properly positioned and the drum starts to rotate in the direction indicated by the arrow in Fig. 18, the roller 398 on contact lever 392 engaging contact strip 385 will effect the closing of the switch 404 and complete the circuit through the table raising solenoids 60 and 61 and upon energization of these solenoids, the table top 21 will be moved to elevated position to transfer the weight of the glass sheet from the supporting rollers to the table top. Upon closing of the switch 404, the current enters from the positive main line 441 through a wire 442 and passes through the switch 404 and wire 443 to the solenoid 61 and thence to the negative main line 444 through wire 445. A part of the current will also pass from the wire 443 through solenoid 60 and thence outwardly through wire 446 to the negative main line.

Substantially simultaneously with the raising of the table top, the template cutter stop solenoid 287 is adapted to be energized to draw the stop bar 278 out of engagement with the stop pin 277 to permit movement of the template cutting unit 24. This is accomplished when the roller 399 on contact lever 393 engages the contact strip 386 to close switch 405 whereupon electric current entering through wire 447 will pass through the switch 405 and wire 448 to the template cutter stop solenoid 287 and thence outwardly through wire 449. Just as soon as the cutting table is moved to elevated position, the template cutter motor 260 will be placed in operation to drive the template cutting unit around the track template 23. The motor 260 is placed in operation just as soon as the roller 400 on contact lever 394 engages the contact strip 387 to effect the closing of the switch 406 whereupon the current entering through line 450 will pass through said switch 406 and thence through the wire 451 to motor 260 and out through wire 452 to the negative main line.

After the glass sheet has been delivered from the approach conveyor 30 onto the cutting table, the operation of said approach conveyor is discontinued and the stopping of the conveyor is effected when the solenoid 173 is energized (Fig. 8) to disengage the discs 159 and 160 of the friction clutch 156. When the solenoid 173 is energized, the current entering through wire 453 passes through switch 407 and wire 454 to the solenoid 173 and from said solenoid through a wire 455 to the negative main line.

When the template cutting unit 24 reaches approximately the point $a$ (Fig. 1) in its travel around the template, the cross cutter motor 322 will be placed in operation due to the fact that at this time the roller 402 on contact lever 396 engages the contact strip 389 to effect the closing of switch 408. The current entering through line 456 passes through switch 408, wire 457, and reversible switch 458 to the reversible motor 322, and thence from the motor through wire 459 leading to the negative main line. Upon operation of the motor 322, the sprocket chain 316 will be driven to move the cutting unit 27 along the rails 301 and 302, and the movement of the cutting unit is continued until said unit engages stop 338 (Fig. 5) which prevents further movement of the cutting unit. Although the cutting unit is brought to a stop, the motor 322 may continue to operate for a relatively longer period of time due to the provision of the friction clutch 325.

When the template cutting unit 24 reaches approximately the point $a$, the control drum 384 has completed one-half a revolution, so that the lug 420 thereon engaging stop member 421 will bring said drum temporarily to a stop. However, the shaft 410 will continue to rotate due to the provision of the friction clutch 414. Likewise, the template cutting unit 24 will still be driven as the switch 406 is still closed. Upon continued movement of the template cutting unit, the stop pin 277 thereon engages an arm 460 (Figs. 1 and 17) pivoted at one end as at 461 to a horizontal plate 462. Carried by the plate 462 is a stationary contact 463, while carried by the arm 460 is a spring contact 464, the contacts 463 and 464 being normally held apart by a tension spring 465, with the outward movement of said arm 460 being controlled by a pin 466 carried by plate 462 and operating in a slot 467 in said arm. When the guide pin 277 on the cutting unit engages the arm 460, the said arm is moved inwardly about its pivot to bring the contacts 463 and 464 into engagement with one another whereby to again close the circuit through the solenoid 428 (Fig. 16) at which time the current enters wire 468 and, after passing through contacts 463 and 464, flows through wire 438 to the solenoid 428 and thence out through wire 439 to the negative main line 440. The closing of this circuit will again cause the energization of the solenoid 428 to move the stop member 421 away from lug 420, thereby permitting the drum to again rotate. When the template cutting unit passes beyond the arm 460, the spring 465 will move the contacts 463 and 464 apart to break the circuit through the solenoid 428 so that the spring 432 can act to move the stop member 421 into the path of travel of the lug 419.

When the template cutting unit 24 reaches approximately the point $b$ (Fig. 1), the positive drive therefor will be discontinued so that the cutting unit will be permitted to coast the remainder of its cycle or stroke. In other words, when the cutting unit reaches point $b$, the roller 400 on contact lever 394 will pass out of engagement with the contact strip 387 to open the switch 406 and break the circuit through the motor 260. As the cutting unit reaches the end of its cutting stroke, the speed of travel thereof will first be slowed down by frictional contact of the stop pin 277 with the levers 268 and 269 of the cutter stop mechanism, after which the said unit will be brought to a stop by engagement of said pin 277 with the stop bar 278, said bar having been previously returned to operative position when the rotation of the control drum moved the contact strip 386 out of engagement with the roller 399 on contact lever 393 to open switch 405 and break the circuit through solenoid 287. The operation of the cross cutter motor 322 is discontinued when the roller 402 on contact lever 396 passes out of engagement with contact strip 389 to open switch 408.

After the glass sheet has been properly scored by the cutting wheels 25 and 28 of the cutting units 24 and 27, the table raising solenoids 60 and 61 are de-energized to permit lowering of the table, and to this end the contact strip 385 is of such a length that after the cutting of the sheet has been completed, the roller 398 on contact lever 392 will move out of engagement with said contact strip, thereby opening switch 404 and breaking the circuit through the solenoids 60 and 61. When the table top 21 is lowered, the glass sheet will again be brought to rest on the rollers 89 to 94 and just as soon as the table top is lowered, the roller 403 on contact lever 397 will engage contact strip 390 to effect the closing of switch 409, thereby completing the circuit through the solenoid 357 to cause the raising of the stop plate 345 of stop means 341 and the transfer of the sheet from the cutting table onto the take-off conveyor 31. Due to the fact that the contact strip 390 is relatively short, the stop plate 345 will be only momentarily raised to permit the forward end of the sheet to pass therebeneath, after which it will be again lowered upon opening of the switch 409 to engage the glass. The provision of the rollers 366, however, permit the transfer of the sheet from the cutting table to the take-off runway with very little friction. When the switch 409 is closed, the electric current will enter through wire 469 and will pass through the switch 409 and wire 470 to the solenoid 357, and thence outwardly through wire 471. As the cut glass is being transferred from the cutting table to the take-off conveyor, the rolls of the approach conveyor will again be driven to feed an uncut sheet onto the cutting table. The length of the contact strip 388 on the control drum is such that the switch 407 will be opened to break the circuit through the solenoid 173 (Fig. 8) substantially simultaneously with the raising of the stop plate 345, so that as the cut sheet is being transferred from the cutting table onto the take-off runway, an uncut sheet is being simultaneously delivered from the approach conveyor onto the cutting table. When the uncut sheet is properly positioned upon the cutting table, the above cycle of operations is again repeated. From the above, it will be readily seen that the operation of the cutting machine herein provided is entirely automatic. That is to say, it is only necessary for an operator to place uncut sheets upon the approach conveyor and another operator to remove the cut sheets from the take-off conveyor, the positioning of the sheet upon the cutting table, the cutting thereof, and the delivery of the cut sheet from the table being accomplished automatically.

The object in providing the two lugs 419 and 420 on the control drum 384 and in causing said drum to rotate intermittently is to stop the operation of the machine should the template cutting unit 24 fail for one reason or another to engage plate 460. If the cutting unit fails to engage the arm 460 and close the circuit through the contacts 463 and 464, all operating parts of the machine will be brought to a stop.

The object in rotating the control drum 384 intermittently is so that in the event the template cutting unit 24 fails for one reason or another due to failure of some part of the machine to reach point $a$, the contact 464 will not be moved to engage contact 463 to permit rotation of the drum, with the result that the entire machine will be brought to a standstill with the exception of the rolls 125 of the take-off conveyor and the rolls 91, 93 and 94. However, inasmuch as the table top is elevated above these rolls, the continued operation thereof will make no difference.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In a sheet glass cutting machine, means for supporting the sheet to be cut, a cutting unit including a cutting element engaging the sheet and movable through a predetermined closed path, and a second cutting unit including a cutting element also engaging the sheet and movable along a substantially straight path which intersects the closed path of the first cutting element at two opposed points.

2. In a sheet glass cutting machine, means for supporting the sheet to be cut, a cutting unit including a cutting element engaging the sheet and movable through a predetermined closed path, power actuated means for driving said cutting unit, a second cutting unit including a cutting element also engaging the sheet and movable along a substantially straight path which intersects the closed path of the first cutting element at two opposed points, and power actuated means for driving said second cutting unit.

3. In a sheet glass cutting machine, means for supporting the sheet to be cut, a cutting unit mounted above said supporting means including a cutting element engaging the sheet and movable through a predetermined closed path, and a second cutting unit mounted beneath said supporting means including a cutting element also engaging the sheet and movable along a substantially straight path which intersects the closed path of the first cutting element at two opposed points.

4. In a sheet glass cutting machine, means for supporting the sheet to be cut, a cutting unit mounted above said supporting means including a cutting element engaging the sheet and movable through a predetermined closed path, power actuated means for driving said cutting unit, a second cutting unit mounted beneath said supporting means including a cutting element also engaging the sheet and movable along a substantially straight path which intersects the closed path of the first cutting element at two opposed points, power actuated means for driving said second cutting unit, and means for causing simultaneous operation of the said first and second named cutting units.

5. In a sheet glass cutting machine, means for supporting the sheet to be cut, a track template mounted horizontally above said supporting means, a cutting unit arranged to travel on said track through a closed path and including a cutting element engaging the sheet, and a second cutting unit movable along a substantially straight path and including a cutting element also engaging the sheet and which intersects the closed path of the first cutting element at two opposed points.

6. In a sheet glass cutting machine, means for supporting the sheet to be cut, a track template mounted horizontally above said supporting means, a cutting unit arranged to travel on said track through a closed path and including a cutting element engaging the sheet, power actuated means for driving said cutting unit around said track, a second cutting unit movable along a substantially straight path and including a cutting element also engaging the sheet and which intersects the closed path of the first cutting element at two opposed points, power actuated means for driving said second cutting unit, and a common control means for causing the said first and second named cutting units to operate in predetermined timed relation.

7. In a sheet glass cutting machine, means for supporting the sheet to be cut, a track template mounted horizontally above said supporting means, a cutting unit arranged to travel on said track through a closed path and including a cutting element engaging the sheet, a motor for driving said cutting unit around said track, a second cutting unit mounted beneath said supporting means, movable along a substantially straight path and including a cutting element also engaging the sheet and which intersects the closed path of the first cutting element at two opposed points, a motor for driving said second cutting unit, and electrically operated control means for starting and stopping the said first and second named motors at predetermined intervals to cause the said first and second mentioned cutting units to operate in predetermined timed relation.

8. In a sheet glass cutting machine, means for supporting the sheet to be cut, a track template mounted horizontally above said supporting means, a cutting unit arranged to travel on said track through a closed path and including a cutting element engaging the sheet, power actuated means for driving said cutting unit around said track, and means engaging the said cutting unit for bringing it to a stop upon completion of the cutting operation.

9. In a sheet glass cutting machine, means for supporting the sheet to be cut, a track template mounted horizontally above said supporting means, a cutting unit arranged to travel on said track through a closed path and including a cutting element engaging the sheet, a motor for driving said cutting unit around said track, means engageable by the cutting unit for slowing down the travel thereof as it approaches the end of its cutting cycle, and means associated with said last-mentioned means for bringing said cutting unit to a stop and for maintaining it in such position.

10. In a sheet glass cutting machine, a vertically movable table for supporting the sheet to be cut, a track template mounted horizontally above said table, a cutting unit arranged to travel on said track through a closed path and including a cutting element engaging the sheet, a second cutting unit carried by said table, movable along a substantially straight path and including a cutting element also engaging the sheet and which intersects the closed path of the first cutting element at two opposed points, and means for raising the said table and second cutting unit prior to the beginning of the cutting operation and for lowering them at the completion of said cutting operation.

11. In a sheet glass cutting machine, a vertically movable table for supporting the sheet to be cut, a track template mounted horizontally above said table, a cutting unit arranged to travel on said track through a closed path and including a cutting element engaging the sheet, power actuated means for driving said cutting unit around said track, a second cutting unit carried beneath said table, movable along a substantially straight path and including a cutting element also engaging the sheet and which intersects the closed path of the first cutting element at two opposed points, power actuated means for driving said second cutting unit, and electrically operated means for automatically raising the said table and second cutting unit prior to the beginning of the cutting operation and for lowering them after the cutting operation has been completed.

12. In a sheet glass cutting machine, a vertically movable table for supporting the sheet to be cut, a track template mounted horizontally above said table, a cutting unit arranged to travel on said track through a closed path and including a cutting element engaging the sheet, means for feeding the sheet onto the table, means engaging the front edge of the sheet for stopping the forward movement thereof when it reaches a predetermined position on the table, and means for rendering said stop means ineffective when it is desired to remove the sheet from the table.

13. In a sheet glass cutting machine, a vertically movable table for supporting the sheet to be cut, a track template mounted horizontally above said table, a cutting unit arranged to travel on said track through a closed path and including a cutting element engaging the sheet, means for feeding the sheet onto the table, means engaging the front edge of the sheet for stopping the forward movement thereof when it reaches a predetermined position on the table, means for raising the said table prior to the beginning of the cutting operation and for lowering the same at the completion of said cutting operation, and electrically operated means for automatically rendering said stop means ineffective subsequent to lowering of the table to permit the removal of the sheet therefrom.

14. In a sheet glass cutting machine, a vertically movable table for supporting the sheet to be cut, means for raising and lowering said table, a track template mounted horizontally above the table, a cutting unit arranged to travel on said track through a closed path and including a cutting element engaging the sheet, a motor for driving said cutting unit around said track, means for feeding the sheet onto the table, means engaging the front edge of the sheet for stopping the forward movement thereof when it reaches a predetermined position on the table, and an electrically operated common control means for first raising the table, then starting and subsequently stopping said motor to effect the desired cutting of the sheet, then lowering the said table after the cutting operation has been completed, and finally rendering said stop means ineffective to permit the removal of the sheet from the table.

15. In a sheet glass cutting machine, a vertically movable table for supporting the sheet to be cut, means for raising and lowering said table, a track template mounted horizontally above the table, a cutting unit arranged to travel on said track through a closed path and including a cutting element engaging the sheet, a motor for driving said cutting unit around said track, a second cutting unit carried by said table, movable along a substantially straight path and including a cutting element also engaging the sheet and which intersects the closed path of the first cutting element at two opposed points, a motor for driving said second cutting unit, and electrically operated means for first raising the table and second cutting unit, then starting and subsequently stopping said first and second named motors to effect the desired cutting of the sheet, and finally lowering the table and second cutting unit at the completion of the cutting operation.

16. In a sheet glass cutting machine, a vertically movable table for supporting the sheet to be cut, means for raising and lowering said table, a track template mounted horizontally above the table, a cutting unit arranged to travel on said track through a closed path and including a cutting element engaging the sheet, a motor for driving said cutting unit around said track, a second cutting unit carried by said table, movable along a substantially straight path and including a cutting element also engaging the sheet and which intersects the closed path of the first cutting element at two opposed points, a motor for driving said second cutting unit, means for feeding the sheet onto the table, means engaging the sheet for stopping the forward movement thereof when it reaches a predetermined position on the table, and an electrically operated common control means for first raising the table and second cutting unit, then starting and subsequently stopping said first and second named motors to effect the desired cutting of the sheet, then lowering the table and second cutting unit at the completion of the cutting operation, and finally rendering said stop means ineffective to permit the removal of the sheet from the table.

17. In a sheet glass cutting machine, means for supporting the sheet to be cut, a cutting unit mounted above said supporting means including a cutting element engaging the sheet and movable through a predetermined closed path, power actuated means for driving said cutting unit, a second cutting unit mounted beneath said supporting means including a cutting element also engaging the sheet and movable along a substantially straight path which intersects the closed path of the first cutting element at two opposed points, and power actuated means for driving said second cutting unit.

18. In a sheet glass cutting machine, means for supporting the sheet to be cut, a track template mounted horizontally above said supporting means, a cutting unit arranged to travel on said track through a closed path and including a cutting element engaging the sheet, power actuated means for driving said cutting unit around said track, a second cutting unit movable along a substantially straight path and including a cutting element also engaging the sheet and which intersects the closed path of the first cutting element at two opposed points, and power actuated means for driving said second cutting unit.

19. In a sheet glass cutting machine, means for supporting the sheet to be cut, a track template mounted horizontally above said supporting means, a cutting unit arranged to travel on said track through a closed path and including a cutting element engaging the sheet, means for driving said cutting unit around said track, and means for bringing the said cutting unit to a stop upon completion of the cutting operation.

20. In a sheet glass cutting machine, means for supporting the sheet to be cut, a track template mounted horizontally above said supporting means, a cutting unit arranged to travel on said track through a closed path and including a cutting element engaging the sheet, power actuated means for driving said cutting unit around said track, means for slowing down the travel of the cutting unit as it approaches the end of its cutting cycle, and means for subsequently bringing said cutting unit to a stop.

21. In a sheet glass cutting machine, a table for supporting the sheet to be cut and provided intermediate its ends with a transverse slot, a cutting unit mounted beneath said table and having a cutting element operating in said slot, and power actuated means for driving said cutting unit transversely of said table with the cutting element in engagement with the under surface of the sheet.

22. In a sheet glass cutting machine, a table for supporting the sheet to be cut and provided intermediate its ends with a transverse slot, a cutting unit mounted beneath said table and having a cutting element operating in said slot, power actuated means for driving said cutting unit transversely of said table with the cutting element in engagement with the under surface of the sheet, means for normally urging said cutting element upwardly to maintain it in yieldable engagement with the said sheet, and means for limiting the upward movement of the said cutting element.

23. In a sheet glass cutting machine, means for initially receiving and supporting the sheet to be cut including a plurality of horizontally aligned rolls, a vertically movable table for supporting the sheet during the cutting operation, said table having a transverse slot intermediate its ends, means for raising and lowering said table with the sheet being supported upon the table when it is in raised position, spaced rails secured beneath the table at opposite sides of said slot, a cutting unit mounted to travel on said rails and including a cutting element operating in said slot, and power actuated means for driving said cutting unit along said rails with the cutting element in engagement with the under surface of said sheet.

24. In a sheet glass cutting machine, means for initially receiving and supporting the sheet to be cut including a plurality of horizontally aligned rolls, a vertically movable table for supporting the sheet during the cutting operation, said table having a transverse slot intermediate its ends, means for raising and lowering said table with the sheet being supported upon the table when it is in raised position, spaced rails secured beneath the table at opposite sides of said slot, a cutting unit mounted to travel on said rails and including a cutting element operating in said slot, power actuated means for driving said cutting unit along said rails with the cutting element in engagement with the under surface of said sheet, means for normally urging the cutting element upwardly to maintain it in yieldable engagement with the sheet, and means for limiting the upward movement of said cutting element.

JOSEPH P. CROWLEY.
CONRAD B. SCHAFER.